United States Patent
Haworth et al.

(10) Patent No.: US 10,291,599 B2
(45) Date of Patent: May 14, 2019

(54) SYSTEMS, METHODS AND APPARATUS FOR KEYSTROKE ENCRYPTION

(71) Applicant: UScontracting, Inc., Odenton, MD (US)

(72) Inventors: William F. Haworth, Annapolis, MD (US); Nicholas R. Hruch, Eldersburg, MD (US); Mark E. Fishman, Ellicott City, MD (US)

(73) Assignee: USCONTRACTING, INC., Odenton, MD (US)

( * ) Notice: Subject to any disclaimer, the term of this patent is extended or adjusted under 35 U.S.C. 154(b) by 1 day.

(21) Appl. No.: 15/214,881

(22) Filed: Jul. 20, 2016

(65) Prior Publication Data

US 2018/0026947 A1    Jan. 25, 2018

(51) Int. Cl.
  *H04L 29/06* (2006.01)
  *H04L 9/08* (2006.01)
  *G06F 21/83* (2013.01)

(52) U.S. Cl.
  CPC ........... *H04L 63/06* (2013.01); *G06F 21/83* (2013.01); *H04L 9/0825* (2013.01); *H04L 63/0442* (2013.01); *H04L 63/083* (2013.01); *G06F 2221/031* (2013.01); *H04L 2209/76* (2013.01)

(58) Field of Classification Search
  CPC ....... H04L 63/0428; H04L 9/006; H04L 9/14; H04L 9/30; H04L 63/06; H04L 63/083
  See application file for complete search history.

(56) References Cited

U.S. PATENT DOCUMENTS

| 8,769,304 | B2 | 7/2014 | Kirsch | |
| 8,868,927 | B1* | 10/2014 | Lee | G06F 21/83 713/189 |
| 8,954,747 | B2 | 2/2015 | Sarangdhar et al. | |
| 8,973,107 | B2 | 3/2015 | Pemmaraju | |
| 9,141,823 | B2 | 9/2015 | Dawson | |
| 2003/0007397 | A1* | 1/2003 | Kobayashi | G06F 17/24 365/200 |
| 2006/0049256 | A1* | 3/2006 | von Mueller | G06F 21/72 235/449 |
| 2008/0284842 | A1* | 11/2008 | Hu | H04R 5/00 348/46 |

(Continued)

OTHER PUBLICATIONS

Treat, Keyboard Encryption, IEEE Potentials vol. 21, Issue 3, Aug./Sep. 2002, pp. 40-42 (Year: 2002).*

(Continued)

*Primary Examiner* — Luu T Pham
*Assistant Examiner* — Harvey I Cohen
(74) *Attorney, Agent, or Firm* — NEO IP

(57) ABSTRACT

A keystroke encryption device (KED) exists between the keyboard and the host computing platform including a host PC. The KED examines keystrokes before they are transmitted to the host PC and asymmetrically encrypts the keystrokes when the KED is turned on. The KED allows the keystrokes to pass through as originally indicated by the user when the KED is turned off. The KED accepts a public key from a server, which decrypts the keystrokes using its own public and private key. The keys and an asymmetric encryption algorithm together provide the means by which each keystroke is encrypted before it enters the host PC.

19 Claims, 7 Drawing Sheets

(56) References Cited

U.S. PATENT DOCUMENTS

| | | | |
|---|---|---|---|
| 2010/0180120 A1* | 7/2010 | Frenkel | G06F 21/34 |
| | | | 713/173 |
| 2010/0195825 A1* | 8/2010 | Cini | G06F 21/83 |
| | | | 380/52 |
| 2011/0202772 A1* | 8/2011 | Frenkel | G06F 21/34 |
| | | | 713/176 |
| 2011/0264922 A1* | 10/2011 | Beaumont | G06F 21/84 |
| | | | 713/189 |
| 2013/0007466 A1* | 1/2013 | Sarangdhar | G06F 21/83 |
| | | | 713/189 |
| 2014/0304505 A1* | 10/2014 | Dawson | G06F 21/6227 |
| | | | 713/165 |
| 2015/0046695 A1* | 2/2015 | Philipsz | H04L 63/06 |
| | | | 713/155 |

OTHER PUBLICATIONS

Ashbacher et al.,Decrypting the shark text encryption scheme, ACM, Journal of Computing Sciences, vol. 23 Issue 4, Apr. 2008, pp. 291-294 (Year: 2008).*

* cited by examiner

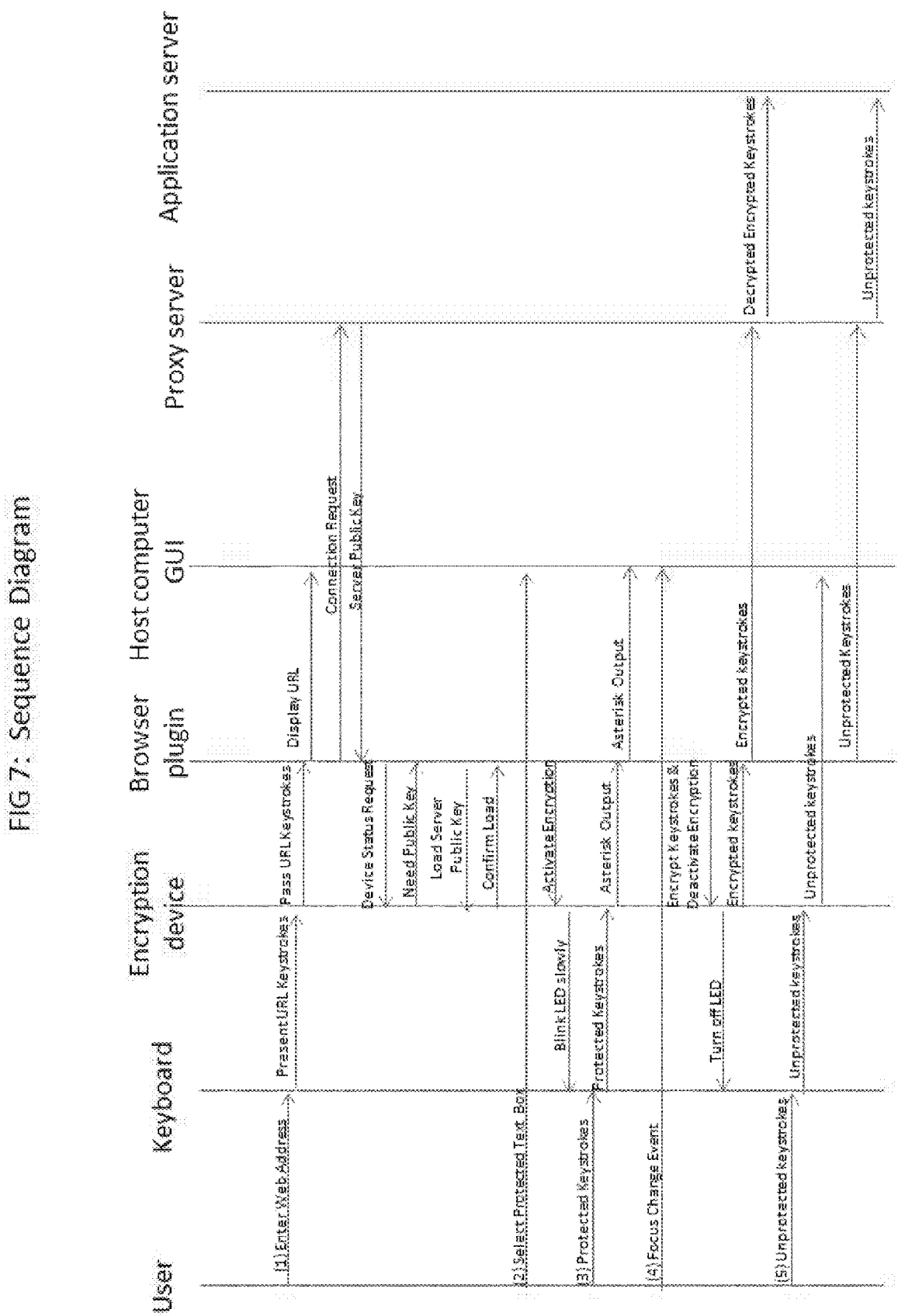

SYSTEMS, METHODS AND APPARATUS FOR KEYSTROKE ENCRYPTION

BACKGROUND OF THE INVENTION

1. Field of the Invention

The invention relates to computer or cyber security as an additional capability to existing infrastructures, more particularly, to keystroke encryption.

2. Description of the Prior Art

Installation of malicious software to include spyware on the compromised computer is a goal of computer attacks. Typical spyware such as a keystroke logger or screen capture virus is then likely to relay information to a criminal enterprise.

Many software products on the market today seek to provide a safe computing space for the user. The fundamental problem with this software stems from the variety and dynamically changing actions of the hacking opponents. Because the type and methods of the attacks change frequently, these products must rely on software updates to identify, thwart, and remove malicious software. Almost every computer connected to the Internet will at some point face an intrusion attack by direct assault or by common social hacking such as phishing via e-mail. In short, many Internet-connected computers will become compromised by hosting malware that has evaded the identification or elimination by current virus protection software.

By way of example the following are relevant prior art documents relating to keystroke encryption:

U.S. Pat. No. 8,954,747 for "Protecting keystrokes received from a keyboard in a platform containing embedded controllers" by inventor Nitin V. Sarangdhar et al, filed Jul. 1, 2011, describes systems and methods of managing keystroke data in embedded keyboard environments. The systems and methods may involve transferring a mode request from a management controller to an embedded controller of a keyboard via a dedicated communication channel. Keystroke activity can be detected at the keyboard, and keystroke data may be transferred from the embedded controller to the management controller via the dedicated communication channel in response to the keystroke activity and the mode request. In addition, the management controller may be used to encrypt the keystroke data, wherein the encrypted keystroke data can be transmitted from the management controller to an off-platform service via a network controller.

U.S. Pat. No. 8,973,107 for "Method and apparatus for securing keystrokes from being intercepted between the keyboard and a browse" by inventor Ram Pemmaraju et al, filed May 16, 2014, describes a method and system for foiling a keylogger by creating a custom keyboard driver and passing the keystrokes directly to the browser in an encrypted format. The browser (which is used to access the Internet) has a component that decrypts the keystroke before it is sent to the website. Thus the present invention enables the user to go to any website and enter sensitive information (passwords, credit card numbers, etc.) without the keystrokes being intercepted by Keyloggers. In general terms, the invention described herein provides a method and system for (1) modifying the keyboard driver, (2) encrypting the keystrokes between the keyboard driver and the browser, and (3) notifying the user if the invention has been compromised.

U.S. Pat. No. 9,141,823 for "Abstraction layer for default encryption with orthogonal encryption logic session object; and automated authentication, with a method for online litigation" by inventor William Johnson Dawson, filed Mar. 15, 2013, describes methods, apparatus, computer program products, software and means for (1) an abstraction layer for default encryption, (2) with orthogonal encryption logic session object, and (3) automated authentication, (4) with a method for online litigation. In some cases subject matter disclosed herein relates to default data encryption; use a user's registration data to generate an encryption logic and related executable code, including servers and client applications; encryption as an automatic background task occurring through variable encryption logic, with authentication; embodiments are also described for conducting online litigation through pleadings formed as meta-files that trigger litigation related algorithms in order to automate and coordinate litigation.

U.S. Pat. No. 8,769,304 for "Method and system for fully encrypted repository" by inventor Steven Todd Kirsch, filed Jun. 15, 2012, describes a method for using information in conjunction with a data repository includes encrypting data associated with the information with an encryption key, sending at least the encrypted data to the data repository, and possibly deleting the information. The method also includes receiving a request for the information from a remote device, and sending a request for the encrypted data to the data repository. The method further includes receiving the encrypted data from the data repository, decrypting the encrypted data using the encryption key, and sending the information to the remote device.

U.S. Publication No. 2010/0195825 for "KEYSTROKE ENCRYPTION SYSTEM" by inventor Frank J. Cini, filed Feb. 5, 2009, describes a keyboard encryption system. The keyboard encryption system enables encryption of keystrokes prior to their entry into a remote desktop. An encryption device is attached via a keyboard cable to a keyboard at one end and to a keyboard socket on a computer on the other end. A remote desktop connection allows for communication between the computer and a remote desktop server. The encryption device contains encryption software to encrypt each keystroke as it is received. The encryption device contains a unique serial number that allows it recognized by decryption software installed on the remote desktop server. The serial number is the primary key for the decryption software to decipher the encrypted keystrokes.

SUMMARY OF THE INVENTION

A keystroke encryption device (KED) exists between the keyboard and the host computing platform including a host PC. The KED examines keystrokes before they are transmitted to the host PC and asymmetrically encrypts the keystrokes when the KED is turned on. The KED allows the keystrokes to pass through as originally indicated by the user when the KED is turned off. The KED accepts a public key from a server, which decrypts the keystrokes using its own public and private key. The keys and an asymmetric encryption algorithm together provide the means by which each keystroke is encrypted before it enters the host PC.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 7 is a sequence diagram illustrating seven operations of keystroke encryption system of the present invention.

DETAILED DESCRIPTION

Figure 1:
FIG. 1 is a diagram of the client hardware in one embodiment of the present invention.

The present invention systems and methods provide a keystroke encryption device (KED) operatively and communicatively connected between a keyboard and a host computing platform. The keystroke encryption device (KED) automatically examines keystrokes entered on the keyboard before they are transmitted to a host computer, host computing device, or a host PC and asymmetrically encrypts the keystrokes when the KED is activated or turned on. When the KED is deactivated or turned off, the KED allows the keystrokes to pass through as originally indicated by the user. The KED is operable to accept a public key transmitted over a network from a server, which is operable to decrypt the keystrokes its own private key. The public and private keys and an asymmetric encryption algorithm function together provide encryption for each keystroke before it is transmitted to the host PC, host computer, or host computing device.

One embodiment of the present invention includes a system for keystroke encryption including an encryption device, a host computer, and a server, wherein the host computer includes a keyboard and a processor, wherein the encryption device is connected between the keyboard and the processor of the host computer via a wired connection or a wireless connection, wherein the host computer is connected to the server via network communication, wherein a browser plugin is installed in the host computer, wherein the server includes a proxy server and an application server, wherein the encryption device is operable to encrypt keystrokes from the keyboard and transmit encrypted keystrokes to the proxy server via the browser plugin, and wherein the proxy server is operable to decrypt the encrypted keystrokes and transmit decrypted keystrokes to the application server.

Another embodiment of the present invention includes a method for keystroke encryption including: connecting an encryption device between a keyboard and a processor of a host computer via a wired connection or a wireless connection, activating the encryption device, the encryption device encrypting keystrokes from the keyboard, the encryption device transmitting encrypted keystrokes to a proxy server via a browser plugin, the proxy server decrypting the encrypted keystrokes from the encryption device, and the proxy server transmitting decrypted keystrokes to an application server.

Yet another embodiment of the present invention includes an apparatus for keystroke encryption including a host microcontroller (MCU) and a device MCU, wherein the host MCU is operable to connect to a keyboard via a first USB interface, wherein the host MCU is operable to examine, packetize and send keystrokes from the keyboard to the device MCU, wherein the device MCU is operable to connect to a host computer via a second USB interface, and wherein the device MCU is operable to encrypt packetized keystrokes from the host MCU, and send encrypted keystrokes to the host computer.

None of the prior art documents describe a keystroke encryption device used between the keyboard and the host computing platform.

This invention does not prevent or disable keyloggers. It encrypts keystrokes such that their capture does not reveal protected information. This invention operates to assume keystrokes that are encrypted on the local, host PC side are decrypted on the remote, server computer side. In one embodiment, the remote side includes a computer and applications running on a trusted operating system, which receives communication connections from the host PC using an agreed protocol such as The Hypertext Transfer Protocol (HTTP) or HTTP Secure (HTTPS).

The KED is operable to receive unencrypted keystrokes entered into a connected keyboard, to automatically transform the unencrypted keystrokes into encrypted keystrokes to protect the information represented by the keystrokes when combined, and to prevent plaintext capture by spyware, such as a keystroke logger on the host PC. On the remote server side, a proxy server is operably and communicatively connected to the system to maintain state for connections and to search for encrypted keystrokes in the application stream. The proxy server specifically finds and removes bounding patterns in the stream and decrypts the encapsulated keystrokes using a standard Public Key Infrastructure (PKI) asymmetric algorithm that uses a public server key and a private server key. The resulting decrypted stream is transmitted to the real application or web server program and processes as it would have been without the KED and proxy server.

The Keystroke Encryption System (KES) includes the following system components constructed and configured for operability when the KED is activated: a proxy server, a browser plugin, and the keyboard encryption device (KED) Preferably, the KED is a device that is operatively connected between the keyboard and the CPU of a computer. The KED is preferably incorporated into the keyboard or plugged into the keyboard port of the computer.

The present invention provides a KED that is compatible with any type of computer keyboard, computer operating system, and/or any computer that is communicatively connected either wired or wireless to the keyboard. In one embodiment, the KED is integrated into or connected to a wireless keyboard.

The present invention provides a KED that is operable to be activated or turned on, and deactivated or turned off automatically by commands from the system, whereby the KED does not affect the keyboard operation in its default, deactivated, or off configuration or setting.

The present invention provides a KED that when activated or turned on, only affects keyboard operation by automatically encrypting keystrokes being transmitted. The KED operation does not affect any other computer operation for the computer associated with the keyboard, including any other type of security function or any operating system task of the computer associated with the keyboard.

The present invention systems and methods provide a keystroke encryption system that does not require software installed on the host computer to include drivers, applications, or patches to the operating system. The KES and KED function without activity or interaction with software installed on the local or host computer. The KED also functions without any driver(s) for, application(s) for, or patch(es) to the operating system.

The KED works seamlessly on existing computers and does not require substantial changes in security architecture on the trusted server side.

The client or host side of the KES includes a host computer with a keyboard port (in one embodiment a USB port), the KED operatively connected and functioning as an encrypting device, and a keyboard. FIG. 1 is an illustration of the client hardware. As a logical configuration, the keyboard is operatively connected or plugged into the encrypting device which is in turn plugged into the keyboard port. However, various physical configurations of a built-in encryption device, including but not limited to built-in to the desktop or host computer, or built-in to the keyboard, are included in this invention. In one embodiment or configuration, the KED in the desktop is operable to receive the keystrokes via the keyboard port or from the wireless keystroke acceptor. In the latter configuration or embodiment, the KED operatively connected with the keyboard encrypts the keystrokes before they are transmitted wirelessly to the desktop computer. In another embodiment, the computer, KED, and keyboard components exist in one built-in configuration, including but not limited to, a laptop computer.

In one example of operation, the KED is deactivated or turned off and does not affect the operation of host PC and keyboard in any way. In one embodiment, when activated or turned on, the device encrypts keystrokes using public asymmetric encryption after it has received the remote server public key. Being able to accept server public keys allows the KED to be used with multiple servers or remote applications, but it also introduces a security hole by which nefarious agents can transmit their own public key and decrypt using their own private key. To close this hole, the key from the proxy server is signed with a recognizable PKI authority key that can be verified and authenticated by the KED. The KED operates to examine the proxy public key when it is loaded to ensure it is signed by valid authority.

Figure 2:
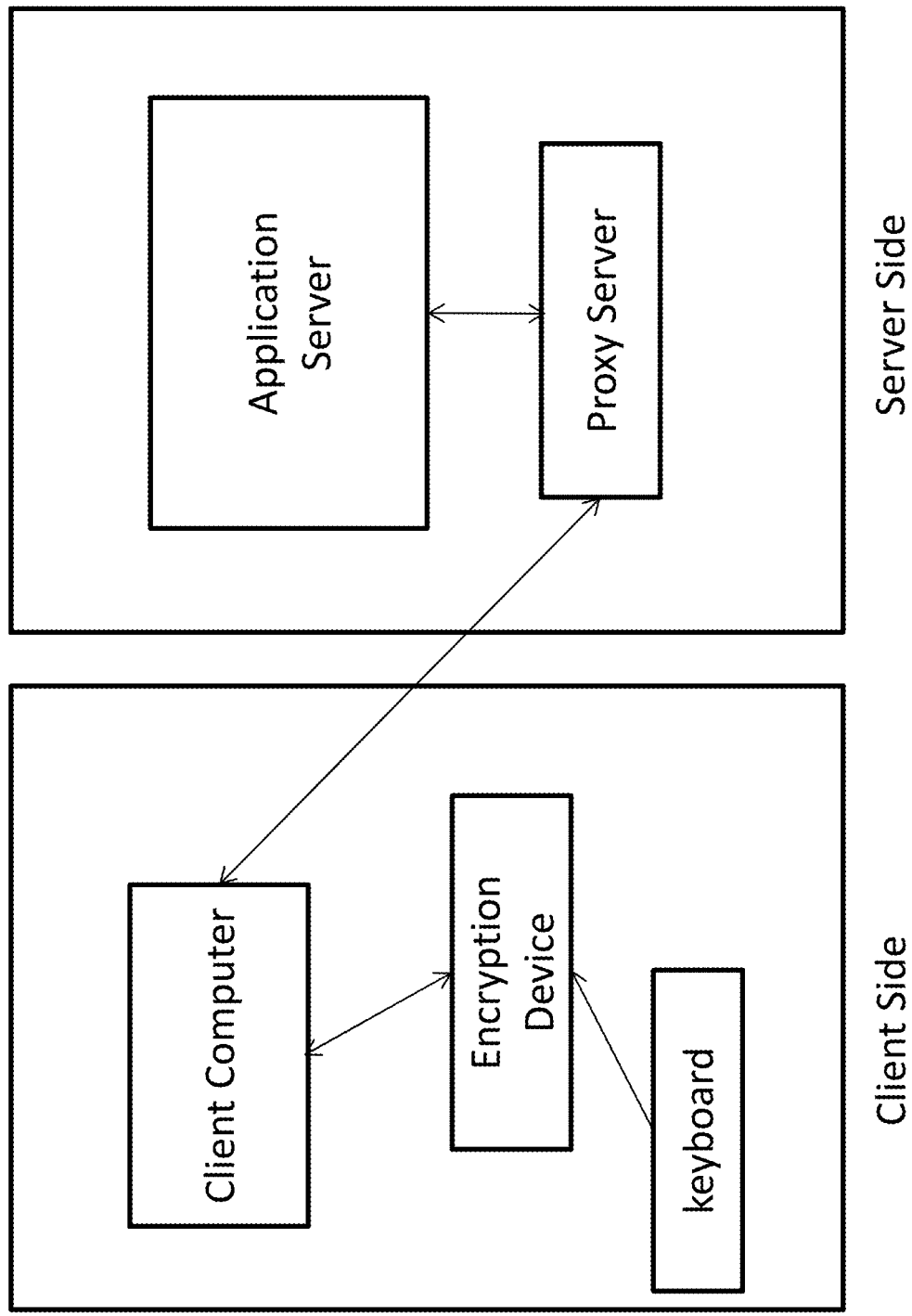
FIG. 2 is a schematic diagram illustrating hardware components in a keystroke encryption system (KES) of the present invention.

In addition to the keystroke encryption operation of the KED, other unique aspects of this application include:
  Transmitting the server public key to the KED using the generic keyboard driver of any operating system.
  Activating or deactivating the KED using the generic keyboard driver of any operating system.
  Receiving the server public key from the KED
  Hardware The hardware for both server and client sides are shown in FIG. 2. On the host PC, only the encryption device is added. On the server side, no additional hardware is necessary. Hardware is included if the proxy server software runs on its own machine. In one embodiment, the software is operable to run on a virtual machine that is on an existing machine of the server site. Further explanation of the hardware pieces is provided below.

Hardware (Host PC)

In one embodiment for a wired configuration, the KED is a distributable medium having two ends with an adapter on one end that operatively engages or plugs into a desktop or laptop computer. On the other end or opposite end is another adapter that allows a keyboard to plug into or operatively couple with the KED. In one embodiment for a wireless configuration, the KED is integrated into the wireless keyboard such that when activated, encrypted keystrokes are transmitted wirelessly. The KED operates to encrypt keystrokes before the keystrokes reach any input components or processing components of the computer.

When the user is ready to enter protected keystrokes, the device is activated or turned on to activate encryption of keystrokes using an asymmetric algorithm with a public server key on the KED. When the KED activated or turned on, seen in a normal text window, the keystrokes appear as asterisks or any other series of uniform letters, numbers, or symbols including but not limited to # symbols and $ symbols. Encrypted keystrokes are transmitted by the KED via at least one network to the server side and decrypted by the server using the private server key. The keystrokes then appear decrypted at the application server exactly as the user typed them into the keyboard.

On the client side or host PC side, the only hardware required is KED. No operating system modifications, installed programs, or device drivers are needed for device operation.

Figure 3:
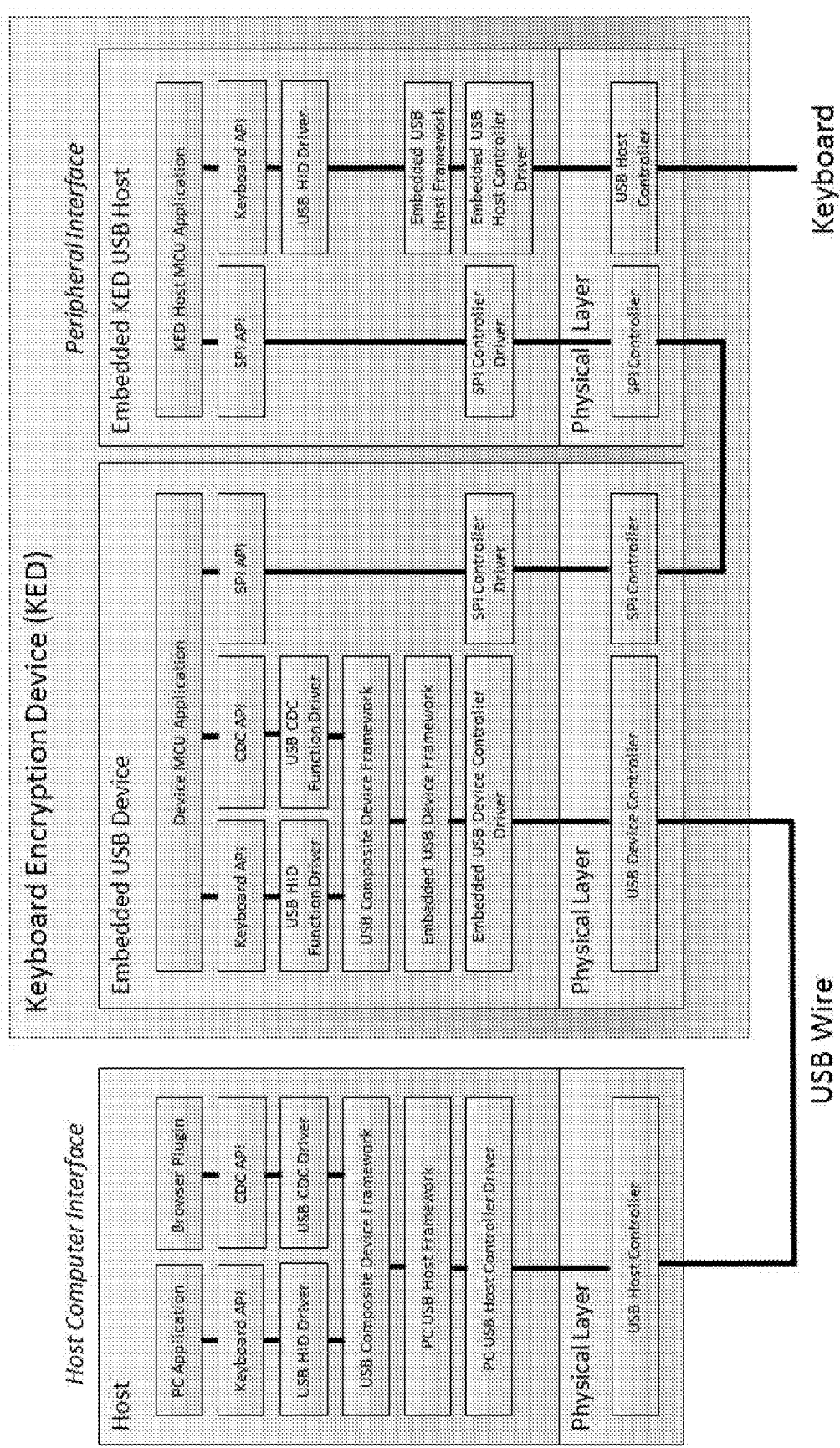
FIG. 3 is a logical architecture diagram of the KED.

FIG. 3 shows a logical architecture diagram of the keyboard encryption device (KED). In this embodiment, the KED has two physical USB interfaces, each of the USB interfaces with its own hardware microcontroller unit (MCU). One USB interface operatively connects by wire to a peripheral device or keyboard, and the other connects by wire to the host PC. The architecture diagram in FIG. 3 shows two embedded USB devices with supporting physical layers. The MCUs implement different versions of the USB stacks to control their assigned physical interfaces. For the peripheral interface shown on the right side of the diagram, the Host MCU implements a Human Input Device (HID) USB Host stack, which consists of a Keyboard API, HID Driver, Embedded USB Host Framework, and Embedded USB Host Controller Driver. The Keyboard API is a Class API and provides firmware level functions to read, write, and evaluate events received or transmitted from the hosted device. This interface is built upon a Class Driver, the HID Driver, which configures the host PC so that it understands the format of received packets from the KED which is implementing a common dynamic protocol. Each HID device (by way of example and not limitation, a keyboard) provides a unique output format specific for the data it creates, placing the HID driver in charge of understanding and parsing the packets accordingly and providing the logical output to the Class API, in this case the Keyboard API. Underneath the HID driver is the core USB Host Framework which implements common functions to help control setup, data transfers, and power management to the KED. When any USB device is plugged in, the host framework handles initialization packets, negotiate transfer rates, the power level for the device and control the state of the device (e.g. not connected, connected, sleep). The lowest level in the firmware stack is preferably the Embedded USB Host Controller Driver, which controls the operation of the physical port, which in one embodiment is the USB Host Controller. Translation of output data to physical operation and buffering of data read off the port is preferably done at this level.

The HID USB host stack attaches, configures and controls the peripheral keyboard by acting as a USB host via the USB Device Controller. One purpose of the HID stack is to receive raw human input from the peripheral keyboard and transfer the inputs to the peripheral interface Host MCU application (depicted in FIG. 3), which is preferably a program running on the Host MCU. The Host MCU application examines and packetizes the keystrokes and sends it to the Device MCU.

Each MCU also preferably implements a Serial Peripheral Interface (SPI) control stack, which includes an SPI API and SPI Controller Driver. The SPI API provides high-level functions to receive and transmit bytes across the SPI bus. The translation of data to physical operation of pins and registers is done using the SPI Controller Driver. These pins and registers are then toggled or read at a hardware level using the SPI Controller. The SPI of the rightmost MCU shown in FIG. 3 serves to send from the Host MCU the packetized keystrokes over the physical layer via the SPI Controller. In symmetric implementation, a second SPI control stack receives the packetized keystrokes and transfers them to the Device MCU application shown in the center of FIG. 3.

The device MCU is preferably a chip that executes the device MCU application, which is a more complex program implementing not only the SPI stack but also two other stacks—one to receive commands directly from the PC and one to send either unencrypted or encrypted keystrokes to the PC. The first of these other stacks, shown on the left side under the device MCU in FIG. 3, includes a keyboard API and the USB HID function driver. The keyboard API is preferably the Class API and provides a set of functions specific to the keyboard device. The USB HID function driver preferably handles the parsing and generation or reports (packets) along with other HID functions required by the USB HID standard.

Along with the HID API exists a Communication Device Control (CDC) API to provide methods for bulk I/O between the KED and the host PC, the host computer, or the host computing device. Because the HID API does not provide a means of transferring binary data that bypasses processing by preloaded Host HID drivers, another interface is used to handle this task. The CDC API provides a set of functions to transfer bulk data between the host PC and the KED over a virtual serial COM port. The USB CDC function driver generates the reports, which are to be transferred in the format described by the global USB report descriptor and passed on to lower level firmware.

Beneath the HID and CDC function drivers exist the USB composite device framework. This framework provides a method to support multiple interfaces on a single USB device. A global USB report descriptor is used to define how a report should be formatted so that HID and CDC data can both be properly handled. When packets are received from the PC, the embedded USB device can make a decision using this framework whether or not to pass it off to the HID function driver or the CDC function driver.

Underneath the USB composite device framework is the embedded USB device framework, and the USB device controller driver. The Embedded USB Device Framework includes core functions used to define a USB device. The core functions include handshakes with the host PC to connect the device, negotiate rates and power, provide initial device descriptors to the host PC, and perform read and write actions on the bus. The USB device controller driver reads the data off the bus and performs the translation of outgoing data to the necessary behavior of the pins and registers which is then relayed to the USB Device Controller to make the actual physical changes.

Figure 4:
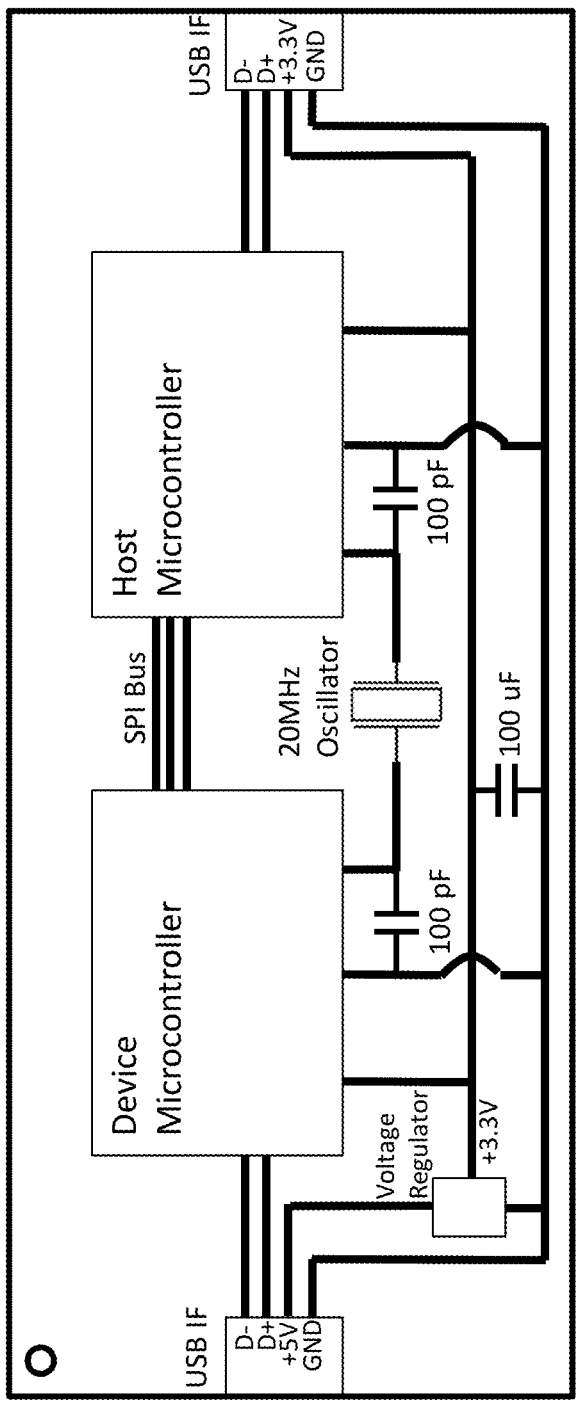
FIG. 4 is a physical architecture diagram of the KED.

FIG. 4 shows the physical architecture of the KED. The device MCU is configured to run off a 20 MHz crystal oscillator and provide a full USB clock rate of 48 MHz through use of a phase lock loop frequency multiplier. When a user plugs a keyboard into the rightmost USB interface, the host MCU enumerates and attaches the keyboard device. Once attached, communication between the keyboard and the host MCU chip can begin. On reception of a keyboard packet indicating user interaction (keyboard press), the host MCU application checks to see if the pattern pressed is one that is recognized as a command.

One of the four commands that the KED understands is a toggle of encryption. If the browser plugin does not desire encryption or does not include a preference for encryption, the device MCU ignores commands to turn on encryption from the keyboard. However, the device MCU will accept a command to turn off encryption from the keyboard even if the browser plugin desires encryption or includes a preference for encryption. This action returns the keyboard to normal operation when the decryption is not working on the remote server host. In general, when encryption is off, the KED is a pass-through device and does not alter keystrokes or exhibit any kind of operation observable by the user. The host MCU places keystrokes that are not commands onto a queue for output through the SPI stacks connecting both MCUs.

The first byte that goes out is a begin transmission designator (value 0xfe). This tells the device MCU that a serialized packet is coming. The second byte sent is the modifier byte that has bits set for each of the modifier keys on the keyboard (LEFT and RIGHT SHIFT, CONTROL, ALT, HOME). The third byte is a NULL (value 0x00) in the keyboard packet to test whether the keyboard prevents encryption (as it would be the case of the KED device manual override function was used). If the keyboard does prevent encryption, the host MCU toggles a bit in the third byte (value 0xf0). Any bytes that follow represent the keys simultaneously pressed. The host MCU sends the bytes as a stream over the SPI stack, and ends the stream with value 0xff to let the device MCU know that no more data is to be expected.

When receiving a byte over the SPI, a thread in the device MCU application checks to see if it is a known indicator significant to the device. A byte of value 0xfe indicates the start of data stream, and the thread reads more input bytes until it sees the end of stream indicator value 0xff. The device MCU thread saves the data as a packet object and places it on a circular queue for processing. While saving, a write pointer for the queue increments while the read pointer remains the same.

The main thread of the KED device MCU looks for differences in the read and write pointers. After sensing a difference, the thread checks the encryption state of the MCU. If encryption is off OR if the encrypted bit of the packet is off, then the unencrypted keyboard presses are already in the expected USB keyboard packet structure and can be sent out directly to the host PC via the USB interface.

If the thread sees the encryption state on AND the packet's encrypted bit is on, the thread replaces the packet contents with a single asterisk symbol to show a keyboard press was registered. The actual content is buffered on the device. After replacing the packet payload, the thread sends out the replaced packet payload over the USB interface, and the displaying program shows an asterisk on whatever window currently has focus. The buffering of the keystrokes continues until a USB command from the host PC tells the thread to turn off encryption and process the buffer. The command to turn off includes a validating token to identify the correct public key and a seed to use for encryption. The encryption seed acts as an initialization point for the encryptions, ensuring that even if the same set up characters were encrypted more than once, their form after encryption would not be the same.

Once the encryption ends, the thread passes the packet buffer to an RSA encryption algorithm, which encrypts the packet payloads prior to transmitting it to the host PC over the USB interface. Once encrypted, the thread sends the data to another endpoint on the PC through the USB port where it can be handled by a PC application like the browser plugin.

Keystrokes that contain non-printable characters or have certain modifier bits set are handled differently when encryption is on or activated for the KED. Because certain keystroke patterns provide additional functionality to the OS, the device should preserve the original payload and pass it to the PC over the normal keystroke USB interface to preserve the functionality. Keystroke patterns that contain CTRL or the HOME button are general indicators of control operations versus display operations. A setting in the encryption ON command indicates if control sequences should be passed through as normal keystrokes. For VPN connections, control keystrokes are generally processed on the remote client as opposed to the host machine. Another setting for the encryption ON command tells the device MCU to buffer and encrypt new line or tab characters. In certain circumstances the browser plugin instructs the KED Device MCU to automatically complete the encryption process as soon as the ENTER or TAB key is pressed.

Figure 5:
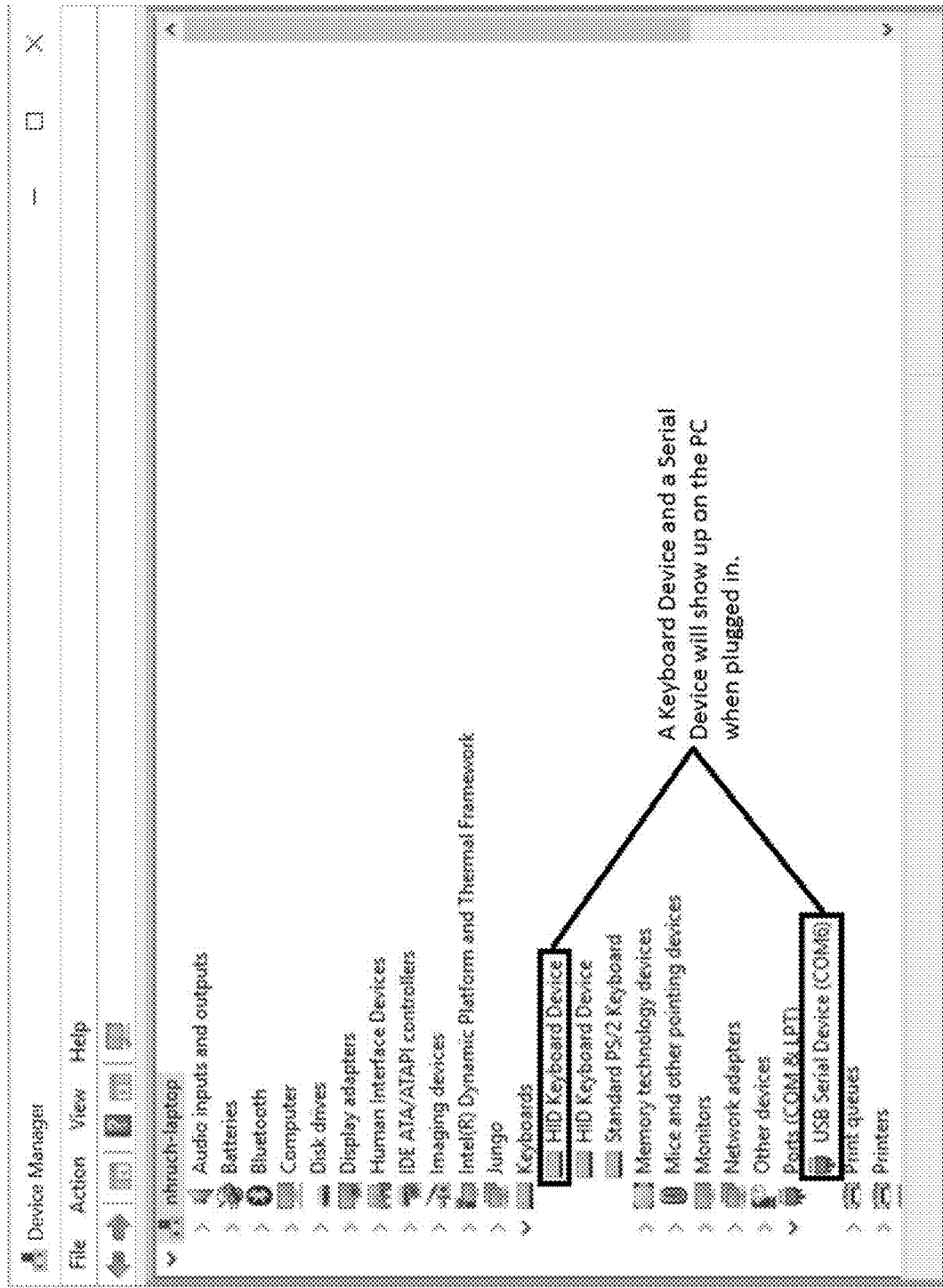
FIG. 5 is a Windows 10 display of the devices registered when one the KED is plugged into a host PC Universal Serial Bus (USB) port.

FIG. 5 shows a Windows 10 display of the devices registered when a KED is plugged into a PC USB port. Two devices are boxed: an HID keyboard device and serial device COM port. Note that, advantageously, these devices require no driver support or extra software installed on the PC.

To support both regular keyboard functionality and serial communications to the KED, the PC interface is implemented as a composite USB device, which uses an Interface Association Descriptor (IAD) to describe multiple endpoints on a single USB interface. Underneath the IAD are an HID descriptor and a Communication Device Class (CDC) descriptor. Each of these descriptors registers a separate device interface on the PC and assigns automatically a different, existing driver to provide the correct functionality. The HID interface registers as an HID keyboard and delivers unaltered keyboard presses received from the peripheral interface to the PC. The CDC interface registers as a virtual COM Port and handles bulk I/O between the PC and device. This CDC is an interface that provides control and configuration to the KED, and it allows transmittal and reception of bulk binary data. These functions are summarized in Table 1.

TABLE 1

| PLUGIN COMMAND | PLUGIN COMMAND PARAMETERS | KED ACTIONS |
| --- | --- | --- |
| Load Public Key | Encryption type, token, Proxy Server URL | Cache key and token |
| Encryption ON | token, seed, field info | LED on; output asterisks for keystrokes |
| Encryption OFF | token | LED off; encrypted keystrokes and buffer |
| Status Request | Proxy Server URL | NONE |

At any time, the browser plugin can send a status request and expect to read the version and encryption status from a response over the COM USB interface. When the browser plugin sends a public key to the KED, it can specify the type of encryption and token to identify the key later. It expects the KED to cache the key and token and return a SUCCESS or FAIL load indicator as over the COM interface as part of the device status. The browser plugin can also send an ON encryption command using the token to specify the appropriate public key. The command can also include a seed for the encryption. Preferably, a response to the browser plugin is not needed and a response to the browser plugin is not received. However, the KED preferably illuminates an LED or another light for encryption, to accumulate keystrokes, and to output over the keyboard USB interface successive asterisks on each button push. If the browser plugin sends an OFF encryption command, the KED preferably turns off the LED and also preferably encrypts and buffers the keystrokes. The browser plugin retrieves the encryption sequence from the COM interface. The sequence preferably contains an encapsulating pattern and all of the buffered keystrokes that have been encrypted with the public key.

PC applications communicate with the KED through the CDC interface. Actions such as gaining or losing focus on a window or a field that supports encryption generate an encryption ON or OFF command, which toggles the encryption state on the device MCU. The browser plugin formats the command and sends it out through the serial COM port where the KED was registered. The command preferably includes field info, which is additional information in the command to help keep track of the active field displayed on the PC. When the device MCU receives a command to encrypt, it saves the state and incoming keystrokes—allowing only asterisks to escape as keystrokes through the normal USB keyboard output. Encryption toggles off either by an OFF command or by specification in the ON command to use a terminating newline in the input. When OFF, the device MCU encrypts the buffer of characters. The browser plugin retrieves them from the CDC interface along with the associated information that helps determine which field to use when transferring the data to the web application form.

The default mode of encryption used on the device is preferably RSA (the encryption first published in 1977 and named after Ron Rivest, Adi Shamir, and Leonard Adleman), but the command can specify a different mode on sending a Load Public Key command. The browser plugin preferably determines when it is interacting with a remote host that supports encrypted input. It retrieves a unique key from the proxy and transfers it down to the KED through the serial COM port using the Load Public Key command.

In response to the browser plugin commands, the KED returns a status that includes: the version details; the public key needed or public key load status; and the encryption on/off status.

Hardware (Server Side)

In one embodiment of the systems and methods of the present invention, to minimize the hardware and system impacts on the server side, only an extra web/application server program is utilized. The program is preferably a replica of the prior existing Internet interface program on the server side that accepts host PC requests over the Internet using a standard protocol like HTTP. This program is either installed on a server-side machine or exists on its own self-contained machine. The program preferably listens on the IP address originally configured for the real web/application server.

Firmware/Software

Figure 6:
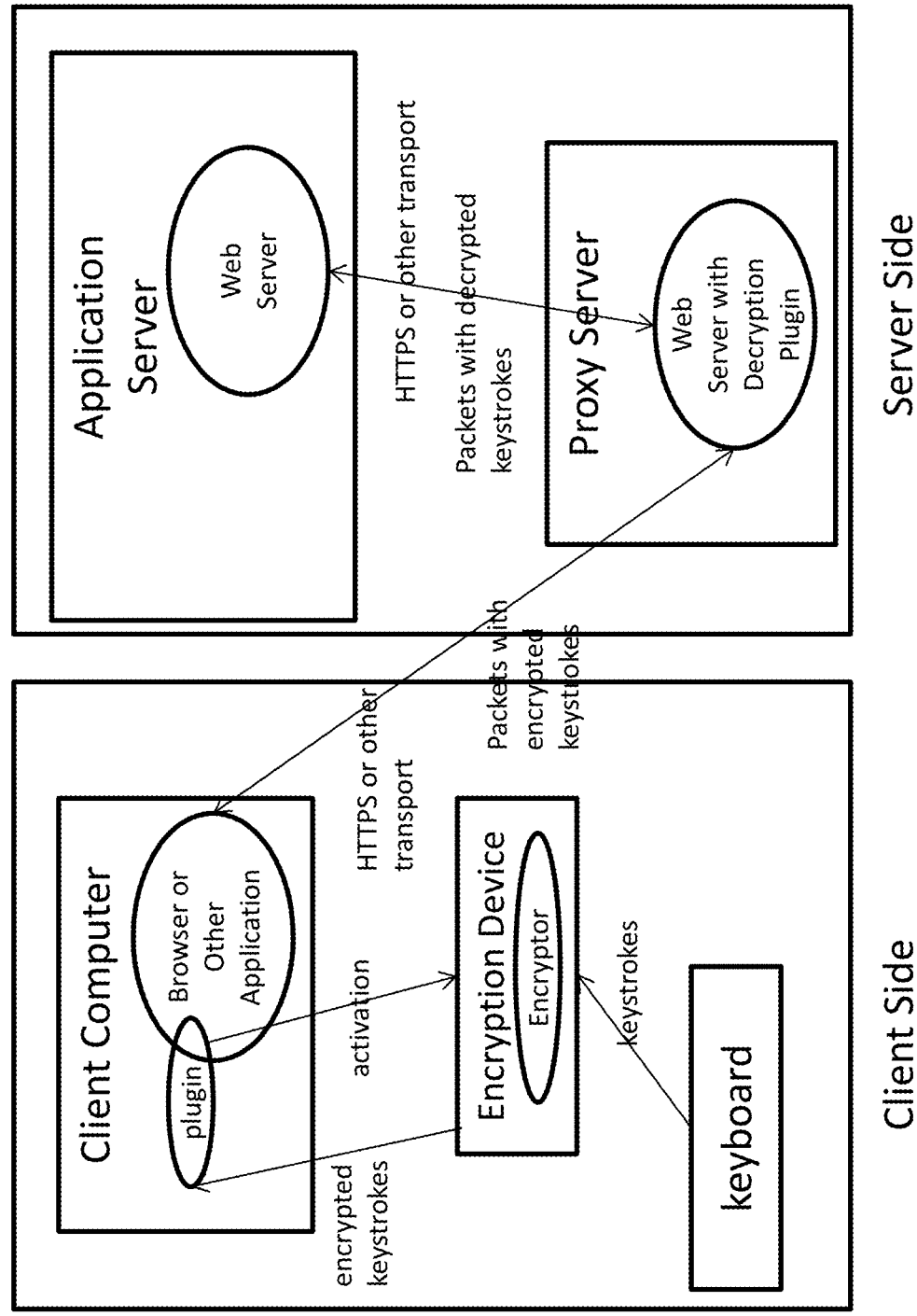
FIG. 6 is a schematic diagram illustrating software and firmware components in a keystroke encryption system of the present invention.

The software and firmware for the encryption system are depicted in FIG. 6.

Firmware (Host PC)

The KED includes storage for a server public key and firmware to perform encryption operations using this key. The KED also includes code to control the keyboard and response to activation or deactivation requests from the user.

In general, a keyboard coupled with a KED appears to function like a normal keyboard, i.e. the computer recognizes it a generic keyboard when the device is plugged into the computer. Note that a wireless keyboard with built-in encryption device is also recognized as a normal wireless keyboard by the client computer so no extra software or drivers are necessary on the client computer.

Software (Server Side)

On the server side, a plugin to the web/application server software recognizes and decrypts keystrokes encrypted by the KED connected to the host PC. One function of the new server software is to act as a proxy to the real site web/application server. The proxy server is configured to run a plugin which examines the input streams on the connections, and looks for specific patterns in the incoming streams. When the plugin detects a pair of patterns, it decrypts the encapsulated bytes using the server's own public and private key. This operation completes the PKI asymmetric decryption process. It reconstructs the stream by removing the specific patterns and replacing the encapsulated bytes with the decrypted bytes. The resulting stream is forwarded to the real site web/application server. Most web servers like Apache can be configured to perform plugin operations and forwarding. The changes on the server side include a reconfiguration of the existing web/application server to listen on a different IP address or port—effectively only accepting connections from the new proxy server. This existing server responds to requests, thereby creating an output stream to the proxy server, which then forwards back to the originating host PC application.

Software (Server Side): Proxy Server

The proxy server resides on the customer's network and proxies all requests to the real, customer server. The proxy server scans the bytes of the proxied request looking for a bounding byte pattern to identify an encrypted block and replace those sections with the unencrypted key strokes. The encrypted bytes are preferably encoded in a base64 format, wrapped with a recognizable bounding pattern. The pattern looked for is preferably in the format:

<bounding pattern><base64(encrypted bytes)><bounding pattern>

While the proxy server has this decrypting stream capability as its main feature, it also includes several additional ancillary capabilities to allow for the setup of the encryption. First, whenever a page is proxied through the server, an http header is added to the response with a key of x-usc-keyencryption-supported and a value of true. This allows the browser plugin to detect that the page being visited supports keyboard encryption.

The second capability includes management of a public/private key encryption pair. The private key is used for decrypting the encrypted keystrokes in the proxied calls. The proxy server exposes the public key by providing a rest endpoint. The rest endpoint is preferably a GET call to https://<server name>:<server port>/keiPublicKey. The public/private key supplied by the proxy server is signed by a certificate authority controlled by the operator of the application server.

To provide increased security, the host PC side of the KES is operable to dynamically detect that a server supports encryption without allowing any attacking systems or malware to be able to discover the encryption capability support.

Software (Host PC)—Browser Plugin

On the client side, a browser plugin communicates with the KED. The host PC software typically includes a browser like Internet Explorer or Firefox to connect to trusted web sites. These browsers allow for a client-developed plugin, which is code that runs in a browser and performs specific functions on the host PC. In the instance of the invention detailed herein, one such plugin handles identification and communication with the KED.

In one embodiment, a browser plugin is the only piece of software that is installed on a personal computer or host PC in order to use the KED. The plugin is preferably an extension to the most common browsers such as by way of example and not limitation, Firefox, Chrome, and Internet Explorer.

Once the plugin is installed in the browser, it monitors the system looking for two different events. First, it monitors for when the KED has been plugged into the computer. Second it monitors web page loads looking for the response headers for the x-usc-keyencryption-supported header in the https response, indicating a site that supports keyboard encryption.

At any point where both a KED is present and a server that supports keyboard encryption is being remotely accessed, the plugin transforms into an active mode. When it enters this mode it operates to make an AJAX call against the rest endpoint on the proxy server to fetch the proxy server's public encryption key. The plugin is operable to cache this key in memory. It also starts monitoring each page served from the proxy server for HTML input fields that accept text. As each page loads, the plugin uses a software such as Javascript to search the loaded DOM looking for input fields. The browser plugin is operable to search for input HTML tags for type text, password, or textarea, and any html tags that are set to contentEditable. Any or all of the fields found undergo the following processes:

Using CSS manipulation, an encrypt icon is injected into the field that operates to allow activation and deactivation of encryption (i.e., to turn on/off encryption) for that field. The icon is present next to each text field of the web application form and operates to allow selection of which fields to encrypt and which to leave unprotected, i.e., selective encryption operation. The browser plugin is operable to recognize fields previously designated as protected so the selection does not have to be entered upon every visit to the website.

In one embodiment, a key accelerator is also added to the field to allow the user to turn encryption on and off using that accelerator (ex: CTRL+SHIFT+e).

A focus listener that is operable to automatically end encryption for the field if the field is in encryption mode and then the field is caused to lose focus.

When encryption is activated, the proxy server public key is passed from the plugin to the KED. The browser plugin uses a native driver for communicating with the encryption device. The KED validates the public key and verifies that it is from a certificate authority that it trusts. If the certificate is trusted, the KED goes into encryption mode and sends back a status to the browser plugin showing it is now ready to encrypt.

As the user types and keystrokes are made, the encryption device is operable to send 0x2A (asterisk) for each key pressed or for each keystroke entry or equivalent activation or signaling of keystroke or key selection or symbol associated with a key is otherwise indicated. Thus, the system provides automatic feedback as a user types or keystrokes are indicated or activated. The KED, meanwhile, is operable to store the original or real (unencrypted) string in its memory.

When a user initiates an action that causes encryption to end or the KED is deactivated or turned off, the browser plugin is operable to send a signal to the KED to end the encryption session. The KED automatically ends its encryption session, encrypts the typed string, and buffers the encrypted bytes. Once the web application form is submitted by the user and/or received by the server, the browser plugin extracts any encrypted bytes from the KED buffer, transforming them to base64 and surrounding them with a bounding pattern as illustrated earlier. The browser plugin then replaces the asterisks in the graphical user interface (GUI) with the base64 encrypted bytes wrapped in the bounding pattern. The full sequence is transmitted to the proxy server for decryption in place of the asterisks. The following are representations of keystrokes as they move through the different parts of the KES:

The KED receives known indicators and keystrokes, <0xfe><keystrokes><0xff>, transforming keystrokes captured into encrypted bytes while the device is on.

The GUI interprets HTML fields and shows the user asterisks in encrypted fields when the KED is turned on: <password>**********</password>.

The browser plugin retrieves encrypted bytes, transforming them into base64, and wrapping them with a bounding pattern which replaces the asterisks in the web application form: <password><bounding pattern><base64(encrypted bytes)><bounding pattern></password>.

The proxy server recognizes the bounding pattern, then translates and decrypts the keystrokes wrapped in the pattern. The unencrypted user keystrokes are inserted into the web application form and sent to the application web server: <password><unencrypted keystrokes></password>.

FIG. 7 illustrates five operations of the present KES invention involved while using with a KED (Operation 1) When a user types in the web address for an application site that supports KEDs, or keystrokes are entered or received by the KED, the browser plugin sends a connection request to the proxy server. In the response, the browser plugin receives the proxy server public key and caches it. The browser plugin then sends a device status request to the KED. The returned status tells the plugin that the device is present, active, and compatible with the proxy server encryption, but that the device needs the proxy server public key to proceed. The browser plugin then provides the device with the server public key. The KED loads the public key then sends a confirmation status to the plugin.

(Operations 2 and 3) When the user puts the focus into one of the fields and chooses to encrypt the field, the browser plugin is operable to activate the encryption device by sending it a simple command. The LED light on the device blinks slowly indicating that the KED is active and ready for encryption. For other instantiations of the KED (e.g. a wireless keyboard, a laptop keyboard, etc.) the visual user feedback varies, or in another embodiment is the same, but is always present and detectable visually.

Appropriate characters on the keyboard are activated to provide the protected information. While the KED is encrypting, it translates keystrokes into asterisks and sends those to the user computer GUI through the browser plugin in place of the protected text.

(Operations 4 and 5) When the focus leaves a protected field, the browser plugin deactivates the KED by sending it a simple command. The KED receives the deactivation request and turns off the LED light to let the user know that encryption is no longer active. When the web application form is submitted by the user, encrypted keystrokes are transferred to the browser plugin and packaged, replacing the asterisks in the form with the appropriate encrypted information before it is submitted to the proxy server. The proxy server identifies encrypted type streams using the bounding patterns and decrypts those keystrokes.

The proxy server handles both encrypted and unprotected information. Unprotected information passes unhindered through the encryption device and browser plugin to the proxy server as illustrated in Operation 5. For encrypted information, the proxy server identifies and decrypts it before it is passed to the customer application server. The information the application server receives is in the same form it would have been had the host PC not been using a KED Elimination of keystroke loggers is a critical component of any secure architecture in systems and methods of the prior art. Most of the products on the market today provide methods to find and remove this malware. However, hackers continue to refine and disguise keystroke logging with the purpose of evading the latest detection. By placing a device between the keyboard and the computer, the systems and methods of the present invention cause keystroke loggers to only see an encrypted stream of characters. The device described in the present application effectively defeats keystroke logging by creating an undecipherable stream of characters for protected information using proven PKI techniques.

Advantageously, this device works where computers are compromised with malware, and where keystroke logging detection or elimination is beyond the capabilities of current virus protection software. The device creates a secure loop in which user keystrokes are only interpreted correctly by an application running in a trusted server-side environment.

Notably, the present invention is inextricably tied to computer technology. More specifically, the present solution is necessarily rooted in computer technology in order to overcome problems specifically arising in the realm of computer networks. Such problems include interception of a user's keystrokes on a keyboard by third parties. Third parties obtain usernames, passwords, and other sensitive information by intercepting keystrokes. Third party interception of keystrokes was not a problem in the pre-computer or pre-Internet world because there were no computers having keyboard inputs connected over a network. Thus, keystrokes could not have been stolen over a network. In one embodiment, the present invention solves the problem of keystroke interception by encrypting the keystrokes before the keystrokes reach the processor of the computer or are transmitted over a network. Thus, the present invention is necessarily rooted in computer technology because the present invention solves problems which only arise in computer technology.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for keystroke encryption, comprising:
an encryption device, a host computer, an application server, and a proxy server;
wherein the host computer comprises a keyboard and a processor;
wherein the encryption device is connected between the keyboard and the processor of the host computer via a wired connection or a wireless connection;
wherein the host computer is connected to the proxy server via network communication; and wherein a browser plugin is installed on a browser of the host computer; and wherein the encryption device is configured to:
  authenticate a unique public key based on a Public Key Infrastructure (PKI) authority key,
  encrypt keystrokes from the keyboard based on the unique public key, and
  transmit the encrypted keystrokes to the browser plugin;

wherein the browser plugin is configured to:
  activate the encryption device,
  receive the encrypted keystrokes,
  package the encrypted keystrokes into an encrypted stream of characters including bounding patterns, and
  transmit the encrypted stream of characters to the proxy server, wherein the encrypted keystrokes are wrapped by the bounding patterns in the encrypted stream of characters;
    wherein the proxy server is configured to:
      manage an encryption pair of the unique public key and a unique private key, wherein the encryption pair is signed by the PKI authority key,
      transmit the unique public key signed with the PKI authority key to the encryption device via the browser plugin,
    recognize and remove the bounding patterns in the encrypted stream of characters,
    decrypt the encrypted keystrokes using the unique private key,
    transmit decrypted keystrokes to the application server, and
    add a response header to a https response when a web page is proxied through the proxy server, wherein the response header indicates the web page supports keyboard encryption; and
  wherein the application server is configured to accept connections only from the proxy server.

2. The system of claim 1, wherein the encryption device is activated by putting focus into one input field and activating encryption.

3. The system of claim 1, wherein the encryption device is configured to communicate with multiple servers and receive and verify multiple unique server public keys from the multiple servers.

4. A method for keystroke encryption, comprising:
  connecting an encryption device between a keyboard and a processor of a host computer via a wired connection or a wireless connection;
  installing a browser plugin on a browser of the host computer, wherein the browser plugin is in network communication with the encryption device and a proxy server;
  authenticating, by the encryption device, a unique public key based on a Public Key Infrastructure (PKI) authority key,
  encrypting, by the encryption device, keystrokes from the keyboard based on the unique public key, and
  transmitting, by the encryption device, encrypted keystrokes to the browser plugin;
  managing, by the proxy server, an encryption pair of the unique public key and a unique private key, wherein the encryption pair is signed by the PKI authority key,
  transmitting, by the proxy server, the unique public key signed with the PKI authority key to the encryption device via the browser plugin,
  recognizing and removing, by the proxy server, the bounding patterns in the encrypted stream of characters,
  decrypting, by the proxy server, the encrypted keystrokes from the encryption device using the unique private key,
  transmitting, by the proxy server, decrypted keystrokes to an application server, and
  adding, by the proxy server, a response header to a https response when a web page is proxied through the proxy server, wherein the response header indicates the web page supports keyboard encryption;
  activating, by the browser plugin, the encryption device;
  receiving, by the browser plugin, the encrypted keystrokes,
  packaging, by the browser plugin, the encrypted keystrokes into an encrypted stream of characters including bounding patterns, wherein the encrypted keystrokes are wrapped by the bounding patterns in the encrypted stream of characters, and
  transmitting, by the browser plugin, the encrypted stream of characters to the proxy server; and
  accepting, by the application server, connections only from the proxy server.

5. The method of claim 4, further comprising activating the encryption device by putting focus into one input field and activating encryption.

6. The method of claim 4, further comprising the encryption device communicating with multiple servers and receiving and verifying multiple unique public keys from the multiple servers.

7. An apparatus for keystroke encryption, comprising: a host microcontroller (MCU) and a device MCU;
  wherein the host MCU is configured to:
    connect to a keyboard via a first USB interface,
    examine, packetize, and send keystrokes from the keyboard to the device MCU,
    connect to a host computer via a second USB interface,
    encrypt packetized keystrokes from the host MCU, and
    send encrypted keystrokes to the host computer;
  wherein a browser plugin, installed on a browser of the host computer, is configured to:
    communicate with the apparatus and a proxy server via a network,
    activate the apparatus for keystroke encryption,
    receive and package the encrypted keystrokes into an encrypted stream of characters including bounding patterns, and
    transmit the encrypted stream of characters to the proxy server, wherein the encrypted keystrokes are wrapped by the bounding patterns in the encrypted stream of characters;
  wherein the proxy server is configured to:
    manage an encryption pair of a unique public key and a unique private key, wherein the encryption pair is signed by a Public Key Infrastructure (PKI) authority key,
    transmit the unique public key signed with the PKI authority key to the apparatus via the browser plugin,
    recognize and remove the bounding patterns in the encrypted stream of characters,
    decrypt the encrypted keystrokes using the unique private key,
    transmit decrypted keystrokes to an application server, and add a response header to a https response when a web page is proxied through the proxy server, wherein the response header indicates the web page supports keyboard encryption, wherein the apparatus is configured to:
authenticate the unique public key based on the PKI authority key,
encrypt keystrokes from the keyboard based on the unique public key, and
transmit encrypted keystrokes to the browser plugin; and wherein the application server is configured to accept connections only from the proxy server.

8. The apparatus of claim 7, wherein the apparatus is further configured to accept a command to deactivate encryption from the browser plugin even if the browser includes a preference for encryption.

9. The apparatus of claim 7, wherein the apparatus is further configured to receive a command to activate encryption from the browser plugin.

10. The apparatus of claim 9, wherein the command to activate encryption includes a seed for initializing encryption.

11. The apparatus of claim 7, wherein the apparatus is further configured to receive a command to deactivate encryption from the browser plugin.

12. The system of claim 1, wherein the browser plugin is configured to monitor a webpage load for a response header indicating whether the webpage supports keyboard encryption.

13. The system of claim 12, wherein the browser plugin is configured to monitor the webpage load for HTML input fields, wherein an encryption icon is displayed next to a HTML input field in the browser, wherein activation or deactivation of the encryption icon provides activation or deactivation of encryption for the HTML input field of the web application.

14. The method of claim 4, further comprising the encryption device receiving unencrypted keystrokes and storing the unencrypted keystrokes in a memory of the encryption device.

15. The method of claim 4, further comprising the browser plugin transforming the encrypted keystrokes to a base64 format.

16. The system of claim 1, wherein the browser plugin is configured to monitor when the encryption device is connected to the processor of the host computer.

17. The system of claim 1, wherein the browser plugin is configured to cache the unique public key signed with the PKI authority key from the proxy server.

18. The system of claim 1, wherein the browser plugin is configured to send a device status request to the encryption device and check if the encryption device is present, active, and compatible with encryption defined by the proxy server.

19. The system of claim 1, wherein the encryption device is configured to send a confirmation status to the browser plugin upon authentication of the unique public key.

* * * * *